(12) United States Patent
Yamada

(10) Patent No.: US 9,756,711 B2
(45) Date of Patent: Sep. 5, 2017

(54) DISCHARGE LAMP LIGHTING APPARATUS

(71) Applicant: USHIO DENKI KABUSHIKI KAISHA, Tokyo (JP)

(72) Inventor: Koji Yamada, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/109,567

(22) PCT Filed: Nov. 14, 2014

(86) PCT No.: PCT/JP2014/080164
§ 371 (c)(1),
(2) Date: Jul. 1, 2016

(87) PCT Pub. No.: WO2015/104897
PCT Pub. Date: Jul. 16, 2015

(65) Prior Publication Data
US 2016/0338183 A1 Nov. 17, 2016

(30) Foreign Application Priority Data
Jan. 7, 2014 (JP) ................................. 2014-000827

(51) Int. Cl.
*H05B 41/24* (2006.01)
*H05B 41/288* (2006.01)
(Continued)

(52) U.S. Cl.
CPC ..... *H05B 41/2888* (2013.01); *G03B 21/2053* (2013.01); *H01J 61/822* (2013.01);
(Continued)

(58) Field of Classification Search
CPC ............ H05B 41/2888; H05B 41/2886; H05B 41/2928; H05B 41/392; G03B 21/2053; H01J 61/822; Y02B 20/208
(Continued)

(56) References Cited

U.S. PATENT DOCUMENTS 8,258,717 B2 9/2012 Yamada
9,137,881 B2 9/2015 Yamada et al.
(Continued)

FOREIGN PATENT DOCUMENTS

JP 2010-244705 A 10/2010
JP 4697326 B2 6/2011
JP 2012-128994 A 7/2012

OTHER PUBLICATIONS

International Search Report issued in PCT/JP2014/080164; dated Feb. 17, 2015.

*Primary Examiner* — Daniel D Chang
(74) *Attorney, Agent, or Firm* — Studebaker & Brackett PC

(57) ABSTRACT

There is provide a discharge lamp lighting apparatus that comprises a discharge lamp and a power supply device configured to drive a regular lighting mode and the low electric power lighting mode in a switchable manner. The power supply device configured to control a power supply to the discharge lamp such that, in the low electric power lighting mode, after a secondary protrusion forming process in which an alternating current having a frequency equal to or greater than the basic frequency in the regular lighting mode is supplied, the low electric power lighting mode transitioning to a secondary protrusion maintaining process in which a high frequency alternating current having a frequency higher than the basic frequency in the regular lighting mode, and a low frequency alternating current having a frequency lower than the frequency of the high frequency alternating current is alternately supplied.

2 Claims, 11 Drawing Sheets

(51) Int. Cl.
　　　　H05B 41/292　　　(2006.01)
　　　　G03B 21/20　　　　(2006.01)
　　　　H01J 61/82　　　　(2006.01)
　　　　H05B 41/392　　　(2006.01)
(52) U.S. Cl.
　　　　CPC ..... *H05B 41/2886* (2013.01); *H05B 41/2928* (2013.01); *H05B 41/392* (2013.01); *Y02B 20/208* (2013.01)
(58) Field of Classification Search
　　　　USPC ........................................ 315/287, 224, 246
　　　　See application file for complete search history.

(56) References Cited

U.S. PATENT DOCUMENTS

2010/0253236 A1* 10/2010 Yamada ............. H05B 41/2887
　　　　　　　　　　　　　　　　　　　　　　　315/246
2013/0271024 A1* 10/2013 Yamada ................ H05B 41/36
　　　　　　　　　　　　　　　　　　　　　　　315/224

* cited by examiner

DISCHARGE LAMP LIGHTING APPARATUS

FIELD OF THE INVENTION

The present invention relates to a discharge lamp lighting apparatus. More particularly, the present invention relates to a discharge lamp lighting apparatus that is capable of lighting a discharge lamp in a stable manner even when a power consumption of the discharge lamp during the discharge lamp is being lit (turned on) is reduced down to 25% to 80% with respect to the rated consumption power.

DESCRIPTION OF THE RELATED ART

Conventionally, a certain type of discharge lamp lighting apparatus has been known, as a light source for an image forming device such as a projector or the like, that mounts a discharge lamp in which mercury of 0.20 $mg/mm^3$ or more is enclosed inside an arc tube. For example, Japanese Patent Publication No. 469736 B (Patent Literature 1) discloses such type of the discharge lamp lighting apparatus.

Among projector devices employing those kinds of discharge lamp lighting apparatuses, a majority of the projector devices have been provided with a so-called "eco-friendly mode (in other words, environmentally friendly mode or eco mode)" more and more in which the incorporated discharge lamp is used with the consumption power of the lamp being reduced than the rated consumption power (consumed power or power consumption). In particular, most recently, the projector devices have been provided with so-called "super eco-friendly mode", that is, a low electric power lighting function in which the power consumption of the discharge lamp is reduced down to 40% to 80% with respect to the rated consumption power.

In the meantime, in this type of lighting mode with lower electric power, as the electric power to be supplied (input) into the discharge lamp is smaller, the temperature at a tip end (front edge) of an electrode is lowered so that an electric arc is unintentionally contracted (or shrunk). For this reason, it entails a problem that a position of the electric arc is likely to become unstable and a flicker phenomenon is likely to occur.

In order to cope with this kind of problem, according to an invention disclosed in Japanese Patent Publication No. 469736 B (Patent Literature 1), a certain technique is disclosed in which, at a tip end (front edge) of the electrodes of the discharge lamp, a secondary protrusion (or projection) is intentionally and proactively formed, in addition to a primary protrusion (or projection) configured to hold the arc at a time of regular (steady or normal) lighting, so that a flickering due to the flicker phenomenon can be reduced even in a condition that the electric arc becomes thinner. Here, the secondary protrusion is configured to be capable of holding the electric arc even at a time of lamp lighting in the lower electric power lighting mode (hereinafter also referred to as a "low electric power lighting period of time").

As for a waveform, as shown in FIG. 11A, the conventional discharge lamp lighting apparatus lights up the discharge lamp with a lighting waveform having both of a time period HT in which an alternating current with a high frequency wave is supplied and another time period LT in which another alternating current with a low frequency wave is supplied, at a time of the regular (steady) lighting to allow the discharge lamp to be lit with, for example, the rated consumption power. When the lighting mode of the discharge lamp is switched to the low electric power lighting mode from the regular lighting mode, as shown in FIG. 11B, in the lighting waveform having both of the time period HT in which an alternating current with the high frequency wave is supplied and another time period LT in which another alternating current with the low frequency wave is supplied, the secondary protrusion is intentionally and proactively formed by adding a boost current with a current value B to the alternating current of the low frequency wave with a current value N during the half cycle of the alternating current with the low frequency wave.

Relying on the above mentioned conventional technique, it has been considered that the electric arc is capable of being maintained in a stable manner even in the low electric power lighting mode (e.g., the super eco-friendly mode) by virtue of the secondary protrusion being formed.

LISTING OF REFERENCE

Patent Literature

Patent Literature 1: Japanese Patent Publication 4697326B

SUMMARY OF THE INVENTION

Problems to be Solved by the Invention

According to the above mentioned conventional discharge lamp lighting apparatus, however, in the lighting waveform in the low electric power lighting mode, a lighting waveform that contributes to form the secondary protrusion is mixed (intermingled) with another lighting waveform that contributes to maintain the formed secondary protrusion.

For this reason, an individual process of each of the secondary protrusion forming and the secondary protrusion maintaining is not necessarily rationalized (or optimized). Accordingly, it takes a long time for the secondary protrusion to grow, and also it is not possible to maintain the secondary protrusion being formed for a long time.

In this regard, the inventors of the present invention have been diligently conducting a study on the above mentioned problem, of which outcome will be described below in a simplified manner. As for forming the secondary protrusion, during the time period HT in which the alternating current with a high frequency is supplied in the conventional lighting waveform of the conventional low electric power lighting mode, the secondary protrusion has being grown. On the other hand, however, during the time period LT in which the alternating current with a low frequency is supplied, the secondary protrusion does not necessarily continue to grow. Instead, it has been observed that the secondary protrusion is melted (or fused) and shrunk due to the rise in the temperature.

On the contrary, however, when lighting the discharge lamp by supplying only the alternating current with the high frequency, then the secondary protrusion is too much worn and damaged, and as a result the secondary protrusion is excessively evaporated and blackened.

The present invention has been made in view of the above mentioned circumstances and findings, and its object is to provide a discharge lamp lighting apparatus that is capable of facilitating a smooth transition to the low electric power lighting mode, and also maintaining the secondary protrusion for a long time of period.

Solution to the Problem

In order to solve the above mentioned problem, according to one aspect of the present invention, there is provided a discharge lamp lighting apparatus comprising a discharge lamp and a power supply device. Inside an arc tube of the discharge lamp, a pair of electrodes each having a protrusion at a tip end thereof are arranged to face each other at an interval equal to or less than 2.0 mm, and mercury and halogen of 0.20 mg/mm$^3$ or more are enclosed. The power supply device supplies the alternating current to the discharge lamp.

The power supply device is configured to drive the discharge lamp in a switchable manner between a regular (steady or constant) lighting mode to light the discharge lamp with a basic frequency selected within a range from 60 Hz to 1,000 Hz and a low electric power lighting mode to drive the discharge lamp at an electric power value within a range from 25% to 80% with respect of a rated consumption power of the discharge lamp.

The power supply device is configured to control, in the low electric power lighting mode, a power supply to the discharge lamp such that a second protrusion forming process transitions to a secondary protrusion maintaining process after the second protrusion forming process.

The secondary protrusion forming process supplies a secondary protrusion forming alternating current having a frequency equal to or greater than the basic frequency in the regular lighting mode, the frequency being selected within a range from 200 Hz to 2,000 Hz, while reducing an electric power of the discharge lamp.

The secondary protrusion maintaining process alternately supplies a secondary protrusion maintaining high frequency current and a secondary protrusion maintaining low frequency current as a secondary protrusion maintaining alternating current. The secondary protrusion maintaining high frequency current has a frequency higher than the basic frequency in the steady lighting mode, the frequency being selected within a range from 100 Hz to 1,500 Hz. The secondary protrusion maintaining low frequency current has a frequency lower than that of the secondary protrusion maintaining high frequency current.

Furthermore, according to another aspect of the present invention, the secondary protrusion forming alternating current may have a frequency equal to or greater than a frequency of the secondary protrusion maintaining high frequency current.

Yet furthermore, according to another aspect of the present invention, during the secondary protrusion maintaining process, a temporal ratio or a lighting waveform of the secondary protrusion maintaining low frequency current with respect to the secondary protrusion maintaining high frequency current may vary depending on any of a lamp electric power, a lamp voltage, a lamp current, and a combined parameter thereof.

Yet furthermore, according to another aspect of the present invention, during the secondary protrusion forming process, a secondary protrusion forming alternating current may be supplied in which a boost current is superposed (superimposed) onto a normal (ordinary) lamp current having a selected frequency at a predetermined temporal incidence (interval).

Yet furthermore, according to another aspect of the present invention, during the secondary protrusion maintaining process, a secondary protrusion maintaining alternating current may be supplied in which a boost current is superposed (superimposed) onto a normal (ordinary) lamp current having a selected frequency at a predetermined temporal incidence (interval).

Yet furthermore, according to another aspect of the present invention, a superposing ratio or a temporal incidence (interval) of the boost current may vary depending on any of a lamp electric power, a lamp voltage, a lamp current, and a combined parameter thereof.

Yet furthermore, according to yet another aspect of the present invention, when the superposing ratio of the boost current is varied, the superposing ratio may be varied in a phased (stepwise) manner towards a target superposing ratio.

Advantageous Effect of the Invention

According to the present embodiments of the present invention, the low electric power lighting mode is newly divided into two processes, that is, a secondary protrusion forming process and a secondary protrusion maintaining process. Also, according to the present embodiments of the present invention, a lighting waveforms, which have been conventionally aggregated as the low electric power lighting mode, are tailored into appropriate lighting waveforms suitable for respective processes, respectively. Accordingly, it makes it possible to facilitate a smooth transition to the low electric power lighting mode and to maintain the secondary protrusion for a long time of period. As a result, it makes it possible to accomplish the power consumption of the lamp to be economized or saved and the life duration of the discharge lamp to be longer.

The above mentioned and other not explicitly mentioned objects, aspects and advantages of the present invention will become apparent to a skilled person from the following detailed description when read and understood in conjunction with the appended claims and drawings.

DETAILED DESCRIPTION OF THE INVENTION

Hereinafter, referring to the accompanying drawings, exemplary embodiments of the present invention will be described in detail.

First Embodiment

Figure 1:
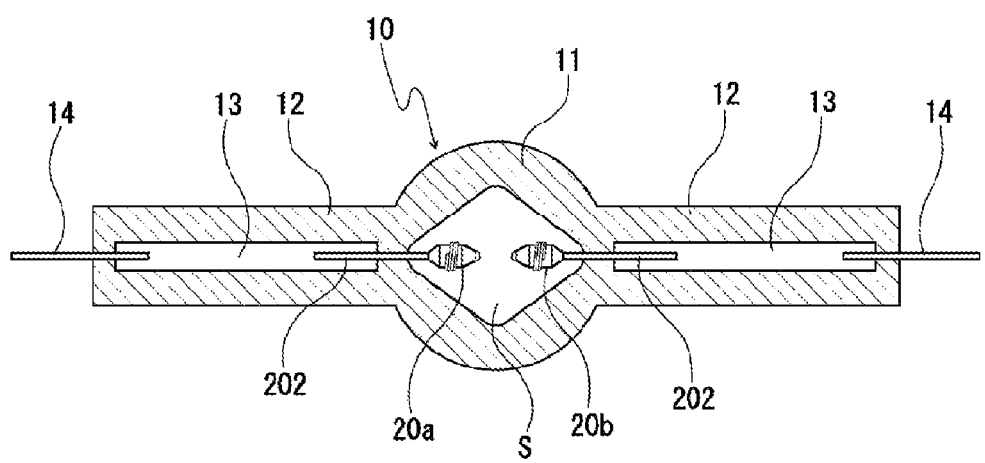
FIG. 1 is a view schematically showing a discharge lamp according to exemplary embodiments of the present invention.
Figure 2:
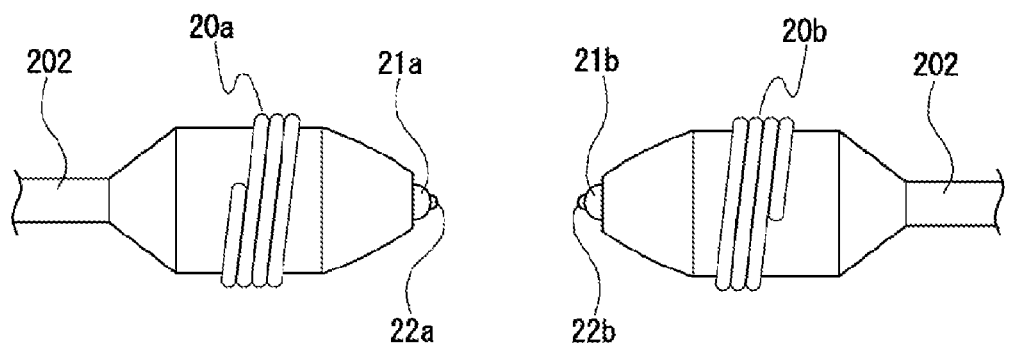
FIG. 2 is a view schematically showing an exemplary configuration of electrodes of the discharge lamp shown in FIG. 1.

FIG. 1 is a view showing an exemplary configuration of a discharge lamp according to exemplary embodiments of the present invention. FIG. 2 is a view showing an exemplary configuration of electrodes of the discharge lamp shown in FIG. 1.

As shown in FIG. 1, an arc tube of a discharge lamp 10 is made of a quartz (silica) glass, and comprises a light emitting (luminous) portion 11 having a substantially elliptical globular shape; and tube sealing portions 12 each having a rod shape, which are consecutively connected to both ends of the light emitting portion 11, respectively.

Inside the light emitting portion 11, a pair of electrodes 20a, 20b consisting of tungsten are arranged to face each other, of which distance between the electrodes is spaced at an interval equal to or less than 2 mm. The electrodes 20a, 20b have, as shown in FIG. 2, primary protrusions (protrusions) 21a, 21b at tip ends (front edges) of the electrodes, respectively. When the lamp is being lit in a low electric power lighting mode, the electrodes 20a, 20b are configured such that secondary protrusions (projections) 22a, 22b are further formed on tip ends of the primary protrusions 21a, 21b of the electrodes, respectively.

It should be noted that the discharge lamp 10 according to the present embodiment is assumed to be lit according to an alternating current lighting method in a regular (steady) lighting mode. Also, the electrodes 20a, 20b are assumed to have fully identical configurations each other for the purpose to facilitate the thermal design when the lamp is being lit in the regular lighting mode.

Inside each of the tube sealing portions 12 located at both ends of the arc tube, metal foils 13 each having a strip shape, which are made of molybdenum, are buried (embedded). End portions of the metal foils 13 at the light emitting portion 11 side are connected to shafts 202, 202 of the electrodes 20a, 20b, respectively. Likewise, the other end portions of the metal foils 13 are connected to outer lead rods 14, 14, respectively.

Mercury, a noble (rare) gas, and a halogen gas are enclosed inside the light emitting tube portion 12 as a discharge medium so as to form a light emitting (luminous) space S.

Mercury is enclosed in order to obtain radiated (emitted) light having a required visible light wavelength, for example, a wavelength of 360 to 780 nm, and mercury of 0.15 mg/mm$^3$ or more is enclosed. This enclosing amount is, although it may vary depending on the temperature condition, determined in order to achieve an extremely high vapor pressure of mercury, that is, 150 atmospheric (air) pressure or more, when the discharge lamp is lit. Also, by enclosing mercury of 0.20 mg/mm$^3$ or more, it makes it possible to fabricate a discharge lamp that is capable of achieving the higher vapor pressure of mercury, that is, 200 atmospheric pressure or more, or even 300 atmospheric pressure or more, when the lamp is lit. In this regard, the higher the vapor pressure of mercury becomes, the more a light source suitably tailored to the projector device is achievable.

The noble (rare) gas of approximately 10 to 26 kPa is enclosed at a static pressure thereof. As the noble gas, for example, an argon gas can be used. The reason why the noble gas is enclosed in this manner is in order to improve the lighting startability (the starting performance of lighting).

Also, the halogen is enclosed in a form of a compound of iodine, bromine, or chlorine or the like with mercury or other metal. The enclosing (filling) amount of the halogen may be selected within a range of $10^{-6}$ to $10^{-2}$ μmol/mm$^3$.

The halogen has a function to achieve a longer life duration of the discharge lamp (in other words, the prevention of blackening) by use of the halogen cycle. Inter alia, in the case of an extremely small (compact) lamp with high vapor pressure of mercury, such as the discharge lamp 10 according to the present embodiment, the halogen functions to prevent the arc tube from being devitrified. It should be noted that, in addition, metal halide (halogenated metal) may be enclosed, as other discharge medium, inside the light emitting space S.

Exemplarily enumerating a concrete numerical examples for this type of discharge lamp 10, for example, a maximum outer diameter of the light emitting portion 11 is 10 mm, a distance between electrodes is 0.7 mm, an inner volume of the light emitting portion 11 is 80 mm$^3$, a rated voltage is 65 V, and a rated power consumption is 270 W. The discharge lamp 10 is lit by an alternating current (AC) method.

Furthermore, this type of discharge lamp 10 is in most cases intended to be incorporated into a projector device that has become more and more miniaturized (downsized). Accordingly, while the discharge lamp 10 is also required to have an extremely miniaturized (downsized) overall dimension, a higher light intensity (light amount) of the discharge lamp is required as well. For this reason, a thermal requirement to be satisfied inside the light emitting portion 11 becomes extremely strict. For example, a bulb (tube) wall load of the discharge lamp 10 is 1.5 to 3.5 W/mm$^2$, more particularly 2.9 W/mm$^2$. By employing such a high vapor pressure of mercury and high bulb (tube) wall load mandatorily, the discharge lamp 10 is capable of providing the radiated (radiation) light with a satisfactory color rendering property, in the case that the discharge lamp 10 is mounted to a presentation equipment such as a projector device or the like.

In the present embodiments throughout the specification, an operational mode to operate the discharge lamp 10 with (at) an electric power value of 25 to 80% on average with respect to the rated power consumption is referred to as a "low electric power lighting mode". On the other hand, another operational mode to operate the discharge lamp 10 with an electric power value greater than 80% on average with respect to the rated power consumption is referred to as a "regular (steady or normal) lighting mode", and in particular, an operational mode to operate the discharge lamp 10 with an electric power value of the rated power consumption is referred to as a "rated lighting mode".

In the case that the discharge lamp 10 is being lit within a small lamp electric power value of 25 to 80% with respect to the rated power consumption (consumption power), by employing a certain lighting condition, which will be described below, it makes it possible to smoothen the growth of the secondary protrusions 22a, 22b, and also to maintain the desired shape of the secondary protrusions 22a, 22b for a long time of period. As a result, it makes it possible to light up the discharge lamp 10 in a stable manner and also to prevent the electrodes 20a, 20b from being worn or abraded.

Figure 3:
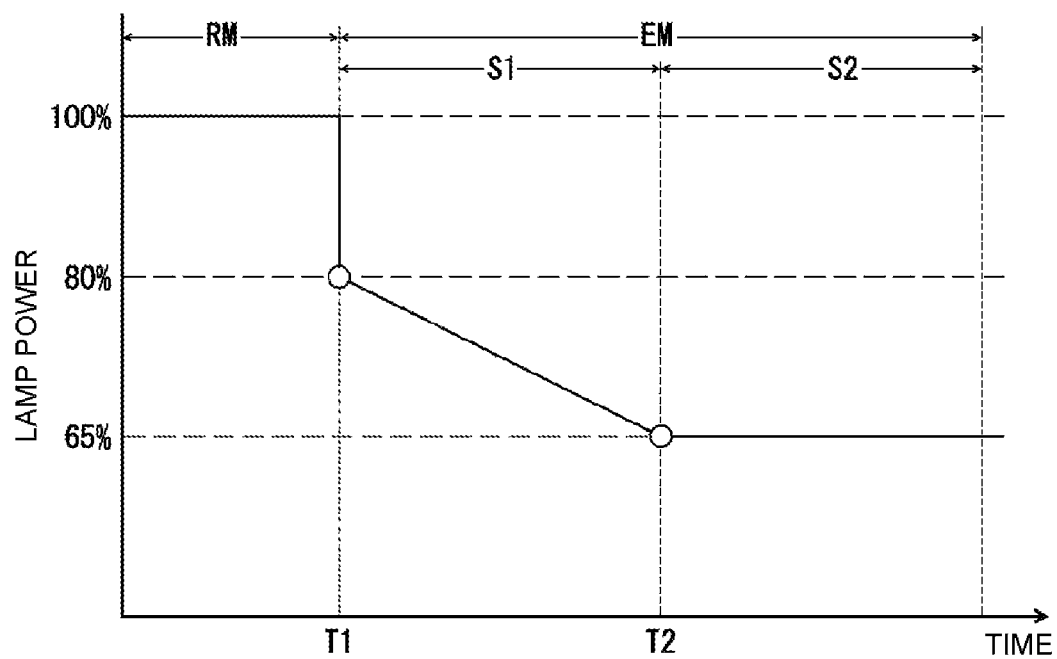
FIG. 3 is a view schematically showing a switching operation between lighting modes according to exemplary embodiments of the present invention.

Referring now to FIG. 3, a switching operation between the lighting modes according to the present embodiment will be described below in detail.

In FIG. 3, a horizontal axis denotes time, and a vertical axis denotes a ratio of the lamp electric power with respect to the rated power consumption which is assumed to be 100%.

From when the discharge lamp 10 is lit until when the time T1 elapses, the discharge lamp 10 is being lit with an electric power value of 100% with respect to the rated power consumption. In other words, this time period is assumed to be the regular lighting mode, more particularly, the rated lighting mode. At a moment the time T1 elapses, when a lighting electric power regulating instruction signal is sent to a controlling unit of the lighting apparatus of the present embodiment from an outside controlling unit of the projector device or the like, then in response to the instruction signal, the lighting mode is switched from the regular (steady) lighting mode RM to the low electric power lighting mode (eco mode) EM.

During the low electric power lighting mode EM, first, a secondary protrusion forming process S1 is carried out so that the secondary protrusions 22a, 22b are formed at the tip ends of the primary protrusions 21a, 21b, respectively. At this moment, a preliminary dimming may be preferably carried out that once reduces the lamp electric power down to a magnitude that can prevent the flicker from occurring solely with the primary protrusions 21a, 21b (i.e., a primary protrusion flicker stabilizing electric power). With the preliminary dimming being performed, after the transition to the secondary protrusion forming process S1, the flickering is unlikely to occur due to the difference in the brightness (luminance). The primary protrusion flicker stabilizing electric power in this example may be, for example, 80% of the rated power consumption. Alternatively, the preliminary dimming may not be carried out.

During the secondary protrusion forming process S1, the secondary protrusions 22a, 22b are being formed quickly while reducing the lamp electric power. At this moment, the lamp electric power may be preferably reduced in a phased (stepwise) manner to form the secondary protrusions 22a, 22b, so that the flickering is effectively prevented from being caused due to the difference in the brightness entailed by the difference in the electric power.

At a moment the time T2 elapses, when the secondary protrusions 22a, 22b are formed, then the process transitions to the secondary protrusion maintaining process S2.

Various means may be used to determine a timing when to transition to the secondary protrusion maintaining process S2, in other words, a timing when the secondary protrusions 22a, 22b have been formed in desired shapes, respectively. More particularly, the timing may be determined by obtaining the most suitable (satisfactory) time period from T1 to T2 based on an experiment, and then setting the time period obtained by a timer or the like. Alternatively, the timing may be determined based on any of a lamp current, a lamp voltage, a lamp electric power, and a combined parameter thereof.

After the time T2 elapses, the lamp electric power reaches a target set electric power of the low electric power lighting mode EM, and the secondary protrusion maintaining process S2 is then carried out. After then, as long as the low electric power lighting mode EM is being instructed, the lighting operation continues with a lighting waveform of the secondary protrusion maintaining process S2. The exemplary target set electric power is, for example, a magnitude of 65% with respect to the rated power consumption.

Figure 4A:
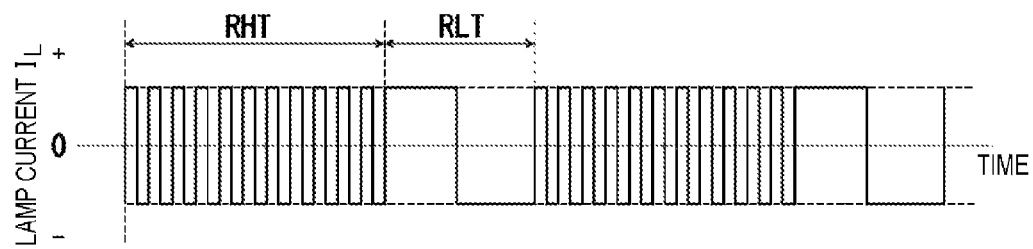
FIG. 4A is a view showing an exemplary lighting waveform in a rated lighting mode according to a first embodiment of the present invention.
Figure 4B:
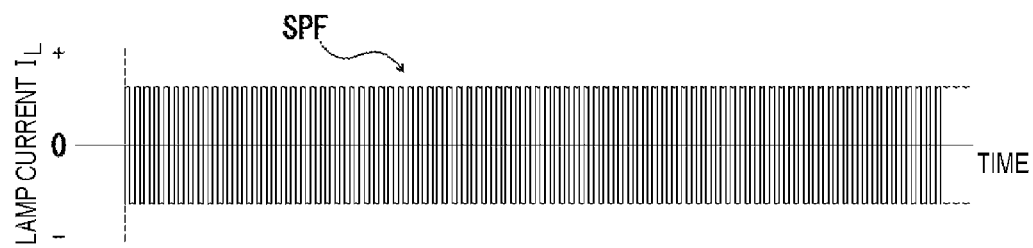
FIG. 4B is a view showing an exemplary lighting waveform in a low electric power lighting mode during a secondary protrusion forming process according to the first embodiment of the present invention.

Hereinafter, more particularly, lighting waveforms during the secondary protrusion forming process S1 and also the secondary protrusion maintaining process S2 will be described below, respectively. FIGS. 4A, 4B and 4D are views showing exemplary lighting waveforms according to a first embodiment of the present invention, respectively. Hereinafter, the waveform will be described using an alternating current waveform having a rectangular wave pulse, which inverts (reverses) the polarity, where a vertical axis denotes a current value of a lamp current $I_L$ and a horizontal axis denotes time.

FIG. 4A is a view showing an exemplary lighting waveform of the rated lighting mode. The lighting waveform is established with combined cycles (combination of cycles) of a high frequency part RHT and a low frequency part RLT. The "high frequency part" RHT is a time period during which a high frequency alternating current is supplied that inverts its polarity with a basic frequency of high frequency, which is selected within a range from 60 to 1,000 Hz. Likewise, the "low frequency part" RLT is a time period during which a low frequency alternating current is supplied that inverts its polarity with a frequency lower than the basic frequency, which is selected within a range from 5 to 200 Hz. It should be noted that the low frequency part RLT is established by not inverting the polarity similarly to the basic frequency. The basic frequency of the high frequency alternating current in this example may be, for example, 370 Hz. On the other hand, the frequency of the low frequency alternating current is this example may be, for example, 30 Hz.

On the contrary, FIG. 4B shows a lighting waveform during the secondary protrusion forming process S1 of the low electric power lighting mode EM. An alternating current SPF for forming the secondary protrusions, which is supplied during the secondary protrusion forming process S1, is a high frequency alternating current that inverts its polarity, similarly to the alternating current in the regular lighting mode RM. More particularly, the secondary protrusion forming alternating current SPF has a frequency higher than the basic frequency in the regular lighting mode RM, the frequency being selected within the range of, for example, 200 to 2,000 Hz. The frequency of the secondary protrusion forming alternating current SPF in this example may be, for example, 1,000 Hz.

The reason why the frequency is set higher in this way is in order to shorten the thermal diffusion length, in other words, the length of a range to which heat is applied from the tip ends of the primary protrusions 21a, 21b of the electrodes 20a, 20b towards base (bottom) sides thereof. With the thermal diffusion length being so shortened, the heat is efficiently transferred solely to the tip ends of the primary protrusions 21a, 21b so that the secondary protrusions 22a, 22b is likely to be formed more quickly.

The frequency of the secondary protrusion forming alternating current SPF is, more preferably, 500 to 1,500 Hz, and yet more preferably, 600 to 1,100 Hz from a viewpoint for setting a predetermined thermal diffusion length and the change in temperature.

Figure 4C:
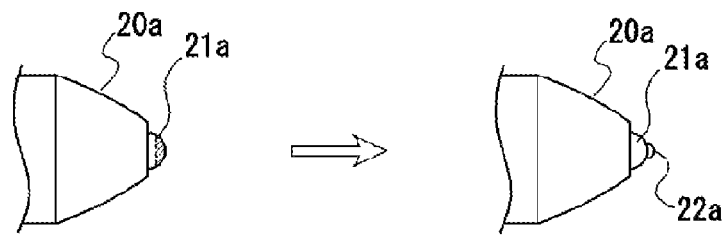
FIG. 4C is a view showing an exemplary status of the electrodes during the secondary protrusion forming process.
Figure 4D:
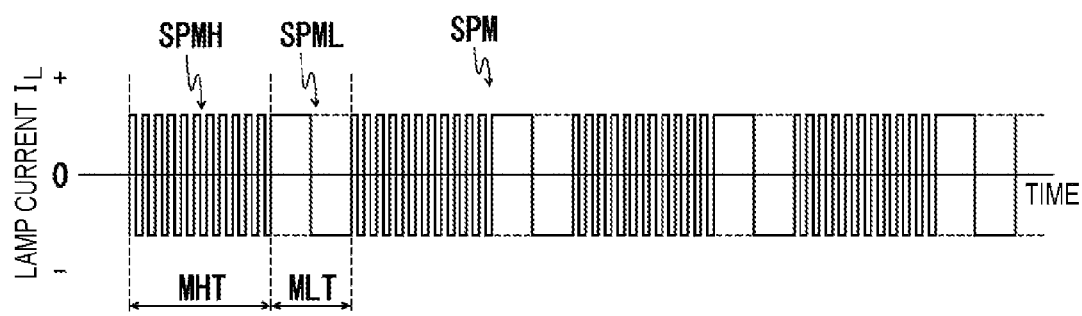
FIG. 4D is a view showing an exemplary lighting waveform during the low electric power lighting mode in a secondary protrusion maintaining process according to the first embodiment of the present invention.

By employing this kind of lighting waveform, as shown in FIG. 4C, the heat is efficiently transferred solely to a further limited region of the primary protrusion 21a located at the tip end of the electrode 20a (i.e., a region with hatched lines for the sake of simplicity in FIG. 4C) so that the secondary protrusion 22a is formed such that the secondary protrusion 22a protrudes from the tip end of the primary protrusion 21a.

Next, the second protrusion maintaining process S2 of the low electric power lighting mode EM will be described below in detail.

FIG. 4D shows an exemplary lighting waveform during the secondary protrusion maintaining process S2. During the secondary protrusion maintaining process S2, a high frequency current SPMH for maintaining the secondary protrusion and a low frequency current SPML are alternately supplied as an alternating current SPM for maintaining the secondary protrusion.

The lighting waveform is established with, similarly to the lighting waveform during the secondary protrusion forming process S1, combined cycles of a high frequency part MHT and a low frequency part MLT. The "high frequency part" MHT is a time period during which the secondary protrusion maintaining high frequency alternating current SPMH is supplied. Likewise, the "low frequency part" MLT is a time period during which the secondary protrusion maintaining low frequency alternating current SPML is supplied. The secondary protrusion maintaining high frequency current SPMH has a frequency higher than the basic frequency in the regular lighting mode, for example, the rated lighting mode RM, the frequency being selected within the range from 100 to 1,500 Hz. The secondary protrusion maintaining low frequency current SPML has a frequency lower than the secondary protrusion maintaining high frequency current SPMH.

The secondary protrusion maintaining low frequency current SPML is, for the sake of simplicity, a current to be purposively intended to dare to collapse the secondary protrusion 22a.

More particularly, assuming that the lighting operation with the secondary protrusion forming alternating current as the former phase is being continued without change even during the secondary protrusion maintaining process S2, the secondary protrusions 22a, 22b are likely to excessively grow so that the electrode material of tungsten is likely to be considerably worn and damaged due to the evaporation or the like of tungsten caused by the arc heat (heated arc). For this reason, when tungsten returns to the electrodes 20a, 20b during the halogen cycle, tungsten is likely to return to an undesired location other than the tip ends of the primary protrusions 21a, 21b. Otherwise, an amount of tungsten inside the primary protrusions 21a, 21b is likely to be reduced due to the wear and damage.

To cope with such deficiency, in order not to allow the secondary protrusions 22a, 22b to excessively grow, during the secondary protrusion maintaining process S2, the secondary protrusions 22a, 22b are melted (fused) and made smaller (minified) so as to suppress the secondary protrusions to grow. More particularly, during the low frequency part MLT, it is assumed that, by inputting the thermal energy solely into one of electrodes for a relatively long time period, the tip ends of the secondary protrusions 22a, 22b are melted (fused) and dispersed.

Furthermore, as the thermal diffusion length is relatively long during the low frequency part MLT, the thermal energy input into the primary protrusions 21a, 21b, which are at the base (bottom) side of the secondary protrusions 22a, 22b, also increases. Thus, with the temperature of the primary protrusions 21a, 21b being increased, successive secondary protrusions 22a, 22b are likely to be formed as well.

As described above, during the low frequency part MLT, while suppressing the secondary protrusions 22a, 22b to grow, it prepares to cause a growth of the successive secondary protrusions 22a and 22b. Therefore it does not mean to simply collapse the secondary protrusions 22a, 22b.

Nevertheless, if it simply suppresses the secondary protrusions 22a and 22b, the secondary protrusions 22a and 22b are assumed to be eventually dispersed. In order to avoid such situation, it is required to have a phase for causing the growth of the secondary protrusions 22a and 22b to some extent. That is, a high frequency part that supplies a high frequency wave current SPMH for maintaining the secondary protrusions.

The secondary protrusion maintaining high frequency current SPHM is, for the sake of simplicity, to cause the growth of the secondary protrusions 22a and 22b in moderation (to some extent). For this reason, it is required to make the thermal diffusion length be longer, in other words, to make the frequency be higher than the basic frequency in the regular lighting mode. On the other hand, it should be noted that the frequency of the secondary protrusion maintaining high frequency current SPMH may be equal to or less than the frequency of the secondary protrusion forming alternating current SPF in order not to excessively cause the growth of the secondary protrusions 22a and 22b. In this regard, it can be said that the secondary protrusion maintaining high frequency current SPMH has a similar function to the secondary protrusion forming alternating current SPF.

Figure 4E:
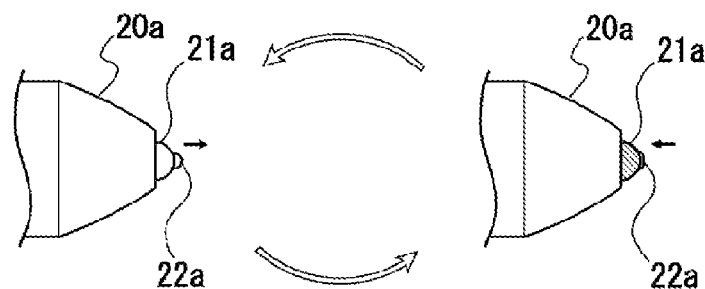
FIG. 4E is a view showing an exemplary status of the electrodes during the secondary protrusion maintaining process.

In addition, however, what is of importance during the secondary protrusion maintaining process S2 is to alternately supply the secondary protrusion maintaining high frequency current SPMH and the secondary protrusion maintaining low frequency current SPML. By doing this, as shown in FIG. 4E, it makes it possible to create the change in the thermal energy to be input into the secondary protrusion 22a which is formed at the tip end of the primary protrusion 21a of the electrode 20a and to carry out a cycle in which the secondary protrusion 22a is contracted and then expanded. As a result, it make it possible to achieve a significant effect that the secondary protrusion 22a is maintained to be in a desired shape in the long term.

The frequency of the secondary protrusion maintaining high frequency current SPMH is, more preferably, for the purpose to cause the growth of the secondary protrusion 22a in moderation, 300 to 1,000 Hz, and yet more preferably, 500 to 800 Hz, from the viewpoint for setting the predetermined thermal diffusion length and the change in temperature.

As described above, during the secondary protrusion maintaining process S2, it is of importance to change the thermal energy to be input into the secondary protrusions 22a and 22b in a cyclic manner. However, because the status inside the light emitting portion 11 of the discharge lamp 10 is being changed from moment to moment, it is required to keep balance of the cycle of the change in the thermal energy as well by appropriately adjusting the cycle.

More particularly, when the tip end of the electrode is worn or damaged under the constant (regular) electric power control, because the voltage between the electrodes depends on the gas pressure and the distance between the electrodes, the lamp voltage increases and the lamp current decreases. When the lamp current is lowered, then an amount of heat generation (heat value) is also lowered. Thus, it may cause a situation in which a desired thermal energy cannot be input into the secondary protrusions 22a and 22b.

Furthermore, not only the constant electric power control, even when a consecutive dimming (light modulating) control (i.e., the lamp electric power being changed) is carried out, assuming that the lamp voltage is constant, the lamp current is assumed to be lowered. As a result, it may also cause the situation in which the amount of thermal energy to be input become insufficient.

As described above, when a change arises in any of the lamp current, the lamp voltage, and the lamp electric power, it is required to match the situation of the change. For this reason, with the lighting waveform being adjusted during the secondary protrusion maintaining process S2, it is assumed that the secondary protrusions 22a and 22b are maintained in an appropriate manner.

Figure 5:
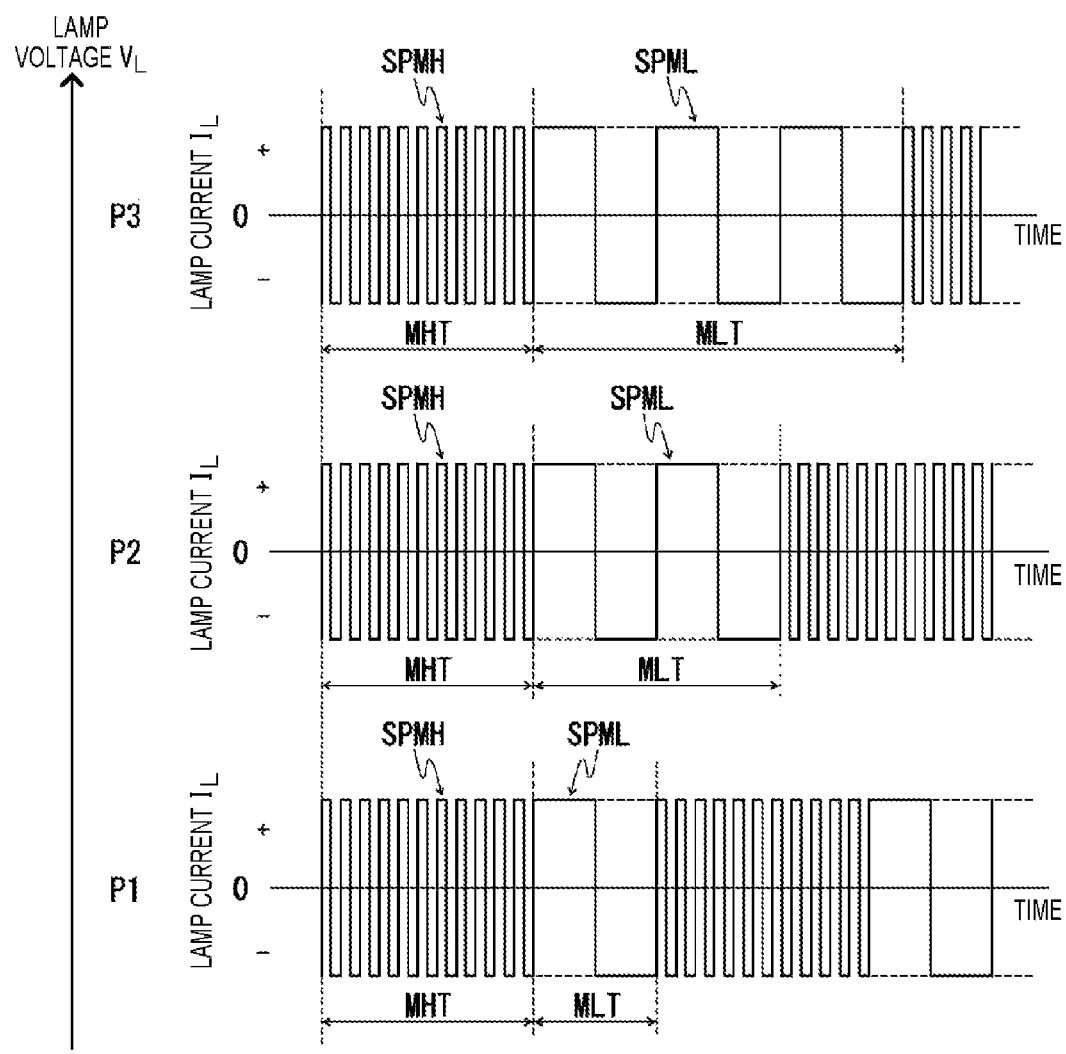
FIG. 5 is a view exemplarily showing a change in the lighting waveform during the secondary protrusion maintaining process according to a second embodiment of the present invention.

FIG. 5 is a view exemplarily showing the change in the lighting waveform during the secondary protrusion maintaining process according to a second embodiment of the present invention. Hereinafter, a certain model will be described below as an example in which the lamp voltage $V_L$ increases due to the wear or damage of the electrodes 20a and 20b under the constant electric power control.

The lighting waveform during the secondary protrusion maintaining process S2 is that the cycle of a rectangular wave pulse of the secondary protrusion maintaining high frequency current SPMH and a rectangular wave pulse of the secondary protrusion maintaining low frequency current SPML is repeated, as described above, so as to light the discharge lamp 10.

Here, assuming that the electrode is worn or damaged due to a certain reason and the lamp voltage $V_L$ increases, as the lamp current decreases, the thermal energy transferred to the secondary protrusion 22a is also lowered.

In order to compensate the lowered thermal energy, a pattern of the lighting waveform transitions from a pattern P1 to a pattern P2. In the pattern P2, compared to the pattern P1, a temporal ratio of the low frequency part MLT, during which the secondary protrusion maintaining low frequency current SPML is supplied, to the high frequency part MHT, during which the secondary protrusion maintaining high frequency current SPMH is supplied, is increased. In other words, with the temporal ratio of the low frequency part MLT being increased, it makes it possible to increase the thermal energy to be transferred to the secondary protrusion 22a so as to compensate the shortfall (deficiency) of the thermal energy.

When the lamp voltage $V_L$ further increases, the lighting waveform further transitions from the pattern P2 to a pattern P3. In the pattern P3, also, compared to the pattern P2, a temporal ratio of the low frequency part MLT, during which the secondary protrusion maintaining low frequency current SPML is supplied, to the high frequency part MHT, during which the secondary protrusion maintaining high frequency current SPMH is supplied, is further increased.

As described above, when the lamp voltage $V_L$ is being increased under the constant electric power control state, with the temporal ratio of the low frequency part MLT being increased, it makes it possible to compensate the shortfall of the thermal energy. In other words, it can be said that similar effect is achievable by reducing the temporal ratio of the high frequency part MHT.

In case that the constant electric power control state is replaced with the consecutive dimming control state, when the lamp current is lowered, with the temporal ratio of the low frequency part MLT being increased, it makes it possible to compensate the shortfall of the thermal energy. It should be noted that the low frequency part may be referred to as a "pseudo low frequency". A concrete example of the lighting waveform of the "pseudo (quasi) low frequency wave" will be described in detail later.

Applying the above mentioned conception, the following means may be also employed other than the increase in the temporal ratio of the low frequency part MLT.

Figure 6A:
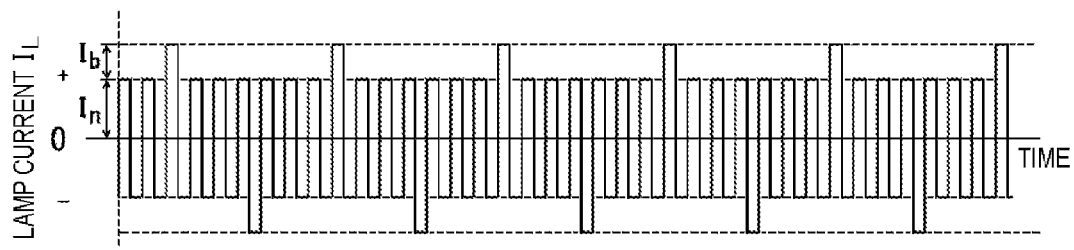
FIG. 6A is a view showing an exemplary lighting waveform in the low electric power lighting mode during the secondary protrusion forming process according to a third embodiment of the present invention.
Figure 6B:
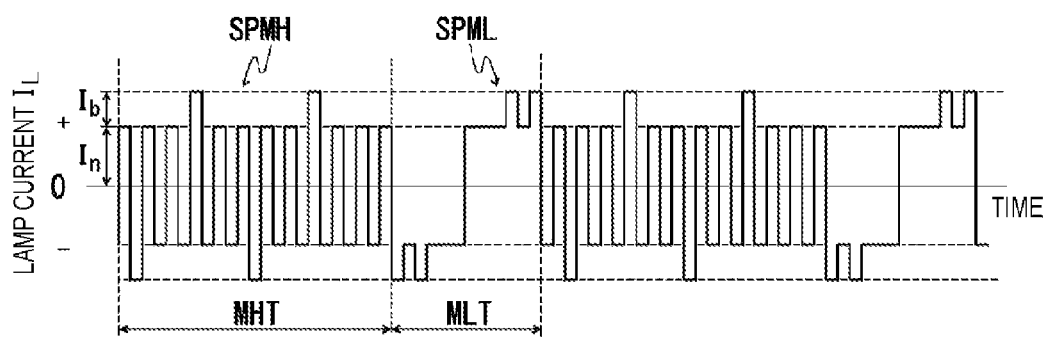
FIG. 6B is a view showing an exemplary lighting waveform in the low electric power lighting mode during the secondary protrusion maintaining process according to the third embodiment of the present invention.

FIGS. 6A and 6B exemplarily show lighting waveforms according to a third embodiment of the present invention, respectively, which are based on the lighting waveforms according to the first embodiment shown in FIGS. 4B and 4D.

More particularly, FIG. 6A is a view showing an example of a lighting waveform during the secondary protrusion forming process S1. In this waveform shown in FIG. 6A, additional current component is superposed (superimposed) onto the regular (normal) lamp current consisting of a rectangular wave pulse of a current value $I_n$. Hereinafter, the current component to be superposed is referred to as a "boost current".

The boost current has a rectangular wave pulse (half wave) with a frequency identical to the basic frequency of the regular (normal) lamp current in the lighting waveform. A temporal incidence (interval) to superpose the boost current may be set based on the basic frequency of the regular lamp current. For example, it is preferable to be once in 0.25 to 10 ms. The temporal incidence (interval) is set for regulating (adjusting) the thermal energy, which will be described in detail later. In this regard, it is more preferably to be once in 0.5 to 5 ms, and further preferably once in 1 to 3 ms.

With the boost current being superposed in this manner, it makes it possible to increase the thermal energy to be input for forming the secondary protrusions 22a and 22b without changing the frequency, in other words, while maintaining the thermal diffusion length. Thus, it makes it possible to form the secondary protrusions 22a and 22b more quickly.

However, if the boost current is constantly superposed, then an average value of the lamp current itself is also considerably increased so that an essential effect or purpose of the low electric power lighting may become meaningless. In this regard, it is not always true that the larger thermal energy to be input for forming the secondary protrusions 22a and 22b is better. Instead, the thermal energy to be additionally input is to be limited within an optimal range.

In order to appropriately set such optimal range, other than the temporal incidence (interval) to superpose the boost current, the thermal energy to be additional input can be regulated by regulating a superposing ratio (i.e., a boost ratio) of a current value $I_b$ of the boost current to a current value $I_n$ of the regular (normal) lamp current.

It should be noted that it is possible to reduce the flickering, which may occur due to the superposed boost current, by setting a target superposing ratio and changing the superposing ratio towards the target superposing ratio in a phased (stepwise) manner.

As described above, the boost current is to be superposed, as appropriate, with an appropriate temporal incidence (interval) and an appropriate boost (superposing) ratio.

FIG. 6B is a view showing an example of a lighting waveform during the secondary protrusion maintaining process S2. In particular, FIG. 6B shows a lighting waveform in which the superposing of the boost current shown in FIG. 6A is also applied to the secondary protrusion maintaining process.

During the high frequency part MHT in the secondary protrusion maintaining process, it is required to have a function similar to the secondary protrusion forming process. For this reason, the boost current with a current value $I_b$ is similarly superposed onto the regular (normal) lamp current with the current value $I_n$, so as to additionally input the thermal energy during the high frequency part MHT in the secondary protrusion maintaining process. Accordingly, it makes it possible to achieve an effect that the secondary protrusions 22a and 22b are likely to be formed more quickly.

On the other hand, during the low frequency part MLT, the boost current is superposed twice or more onto the one polarity inversion (reversal) of the low frequency wave pulse. Accordingly, it makes it possible to achieve a similar effect to the conventional one that tungsten is evaporated.

Furthermore, as already shown in FIG. 5, when any of the lamp current, the lamp voltage, the lamp electric power, and combined parameter thereof changes during the secondary protrusion maintaining process, in response to such change, the boost ratio or the temporal incidence (interval) may be changed in place of increasing the low frequency time period.

This is because increasing the boost ratio, or increasing the temporal incidence (interval), may achieve an effect to compensate the shortfall (deficiency) of the thermal energy as well.

FIGS. 7A to 7D show application examples or modifications of the lighting waveforms, all of which fall into the technical scope of the present invention.

Figure 7A:
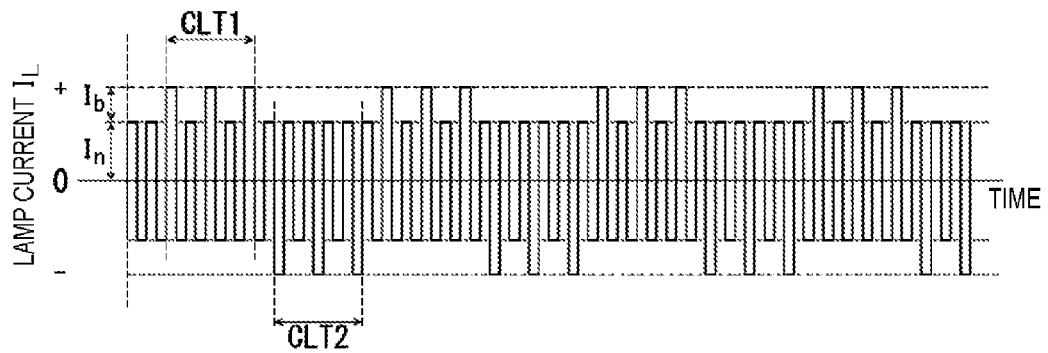
FIG. 7A is a view showing an application example of a lighting waveform during the secondary protrusion forming process according to exemplary embodiments of the present invention.

In particular, FIG. 7A is a view showing a lighting waveform during the secondary protrusion forming process S1. As shown in FIG. 7A, when the lamp is being lit with the high frequency alternating current, using the boost current, a lighting status with a pseudo (quasi) low frequency wave is established.

More particularly, during a time period CLT1, the boost current with the current value $I_b$ is three times superposed onto the regular (normal) lamp current with the current value $I_n$ so that the input electric power is deviated towards the "+" side. In other words, the state is established in which more of thermal energy is consecutively input into one of electrodes for a certain period of time as if it were during the low frequency part. Also, during a time period CLT2, similarly, the boost current with the current value $I_b$ is three times superposed onto the regular (normal) lamp current with the current value $I_n$ so that the input electric power is deviated towards the "−" side. In other words, the state is established in which more of thermal energy is consecutively input into one of electrodes for a certain period of time as if it were during the low frequency part.

The above state is assumed to be a pseudo (quasi) low frequency time periods CLT1 and CLT2. In other words, it is possible to quasi establish a state of low frequency lighting, although it is actually the high frequency lighting.

Establishing the pseudo low frequency part during the secondary protrusion forming process has a significance as follows. During the secondary protrusion forming process, it is required to form the secondary protrusions 22a and 22b quickly so that the frequency is preferably to be maintained to be high. On the other hand, however, in the case that a micro protrusion, which may become the species of the secondary protrusions 22a and 22b, are unanticipatedly formed at an undesired location other than the tip ends of the primary protrusions 21a and 21b, such undesired micro protrusion is required to be eliminated. For this reason, by establishing the pseudo low frequency part, the thermal diffusion region is extended towards the base (bottom) side beyond the tip end. With this configuration, it makes it possible to melt (fuse) and eliminate the micro protrusion formed at the undesired location. As the high frequency lighting is being maintained even during such operation, it is possible to sustain the effect to form the secondary protrusions 22a and 22b quickly. As described above, in this manner, the pseudo low frequency time periods CLT1 and CLT2 are provided that allows the pseudo low frequency part to be generated. Accordingly, it makes it possible to establish the lighting waveform having a plurality of thermal diffusion lengths.

Figure 7B:
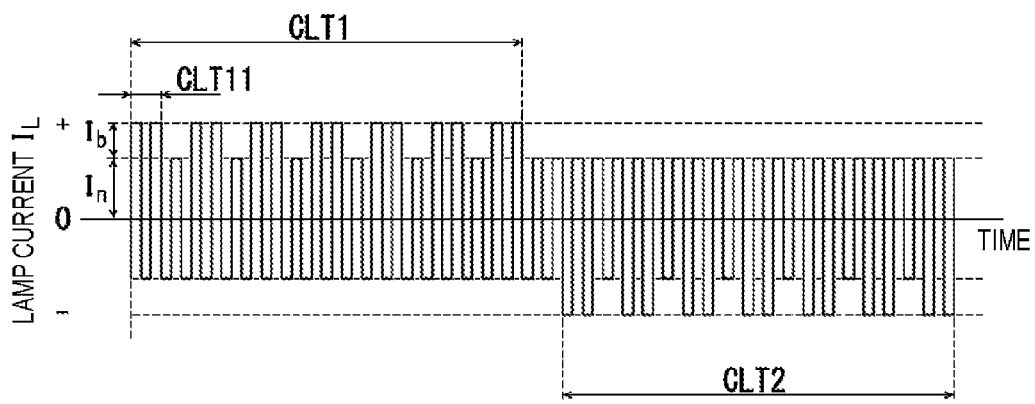
FIG. 7B is a view showing another application example of a lighting waveform during the secondary protrusion forming process according to exemplary embodiments of the present invention.

FIG. 7B is a view showing another lighting waveform to which the lighting waveform shown in FIG. 7A is further applied. As shown in FIG. 7B, observing in a microscopic manner, it can be said that, in the pseudo low frequency time period CLT1, a first pseudo low frequency time period CLT11 is provided in which the boost current with the current value $I_b$ is twice superposed onto the regular lamp current with the current value $I_n$. Further observing in a macroscopic manner, the pseudo low frequency time period CLT1 includes the first pseudo low frequency time period CLT11 seven times. The same applies to a pseudo low frequency time period CLT2.

As described above, in this manner, it makes it possible to allow various thermal diffusion lengths by providing a plurality of pseudo low frequency time periods.

Figure 7C:
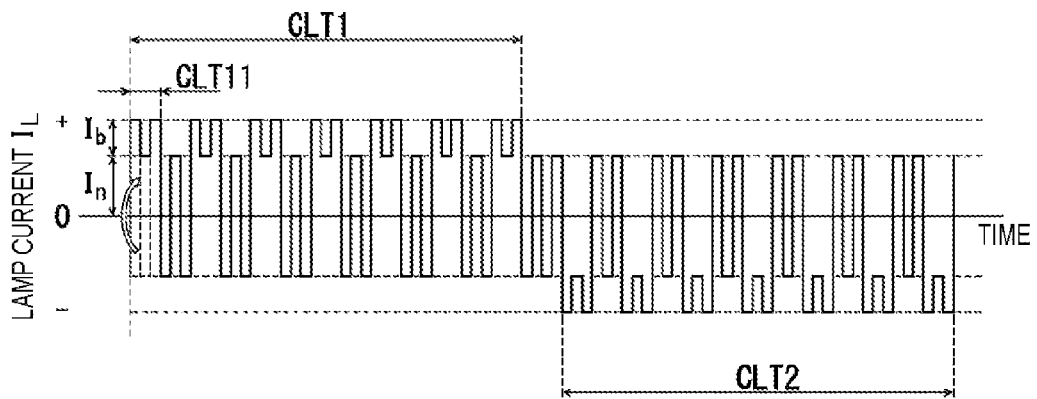
FIG. 7C is a view showing yet another application example of a lighting waveform during the secondary protrusion forming process according to exemplary embodiments of the present invention.

FIG. 7C is a view showing yet another lighting waveform to which the lighting waveform shown in FIG. 7B is yet further applied.

During the secondary protrusion forming process, there is a case that the lamp voltage increases and the lamp current becomes insufficient under the constant electric power control so that the thermal energy for forming the secondary protrusion also become insufficient. In this case, it is possible to compensate the shortfall of the thermal energy by superposing the boost current. However, in the case that the thermal energy is still insufficient even after superposing the boost current, as shown in FIG. 7C, the first pseudo low frequency time period CLT11 may have a waveform with which the low frequency current component is mixed (intermingled). It also makes it possible to compensate the thermal energy insufficient for forming the secondary protrusions 22a and 22b. In this case, on the other hand, the frequency becomes lower so that the speed (velocity) for forming the secondary protrusions 22a and 22b is slightly reduced. In light of those circumstances, the lighting waveform shown in FIG. 7C may be employed as appropriate.

For example, in the lighting waveform shown in FIG. 7C, the boost current with the high frequency is superposed onto the rectangular wave pulse with the low frequency in order to maintain a short thermal diffusion length. It could be assumed that such waveform ensures the high frequency property to some extent.

Figure 7D:
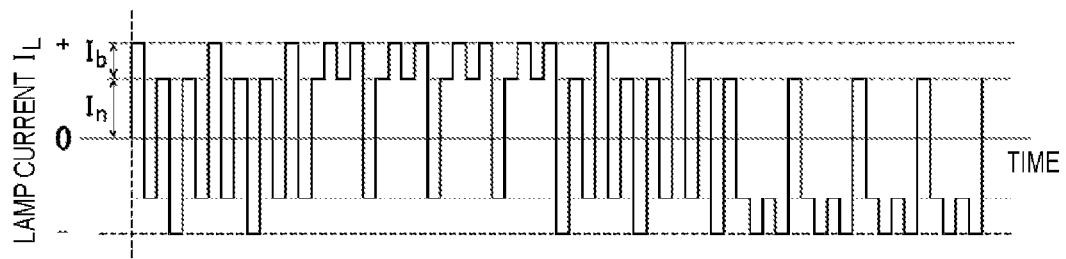
FIG. 7D is a view showing yet another application example of a lighting waveform during the secondary protrusion forming process according to exemplary embodiments of the present invention.

FIG. 7D is also a view showing yet another lighting waveform to which the lighting waveform shown in FIG. 7B is yet further applied.

In the case that, for example, the thermal energy cannot be ensured only by driving with sufficiently short thermal diffusion length, as shown in FIG. 7D, the low frequency current component is intermittently superposed so as to ensure the thermal energy.

In this manner, the low frequency current component may be inserted as appropriate, as means for regulating the thermal energy to be input. In this case, however, the rectangular wave pulse having a frequency identical to the high frequency current component may be superposed onto the rectangular wave pulse with the low frequency as the boost current. As a result, it makes it possible to ensure the high frequency property so as to ensure the growth of the secondary protrusions 22a and 22b to some extent.

Figure 8A:
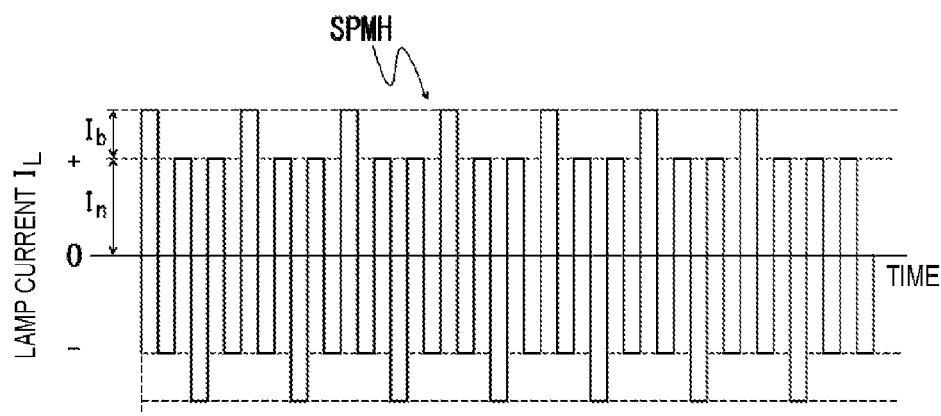
FIG. 8A is a view showing an application example of a lighting waveform of a high frequency part during the secondary protrusion maintaining process according to exemplary embodiments of the present invention.
Figure 8B:
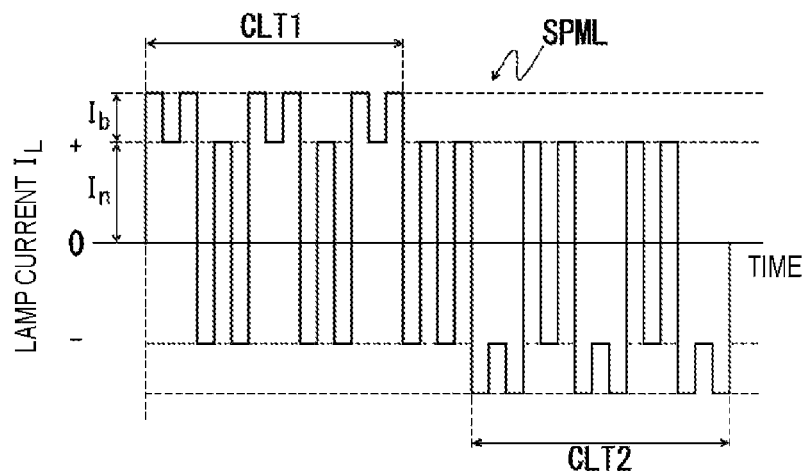
FIG. 8B is a view showing an application example of a lighting waveform of a low frequency part during the secondary protrusion maintaining process according to exemplary embodiments of the present invention.

FIGS. 8A and 8B show an application example of a lighting waveform during the secondary protrusion maintaining process.

As shown in FIG. 8A, during the high frequency part during which the high frequency wave alternating current SPMH for maintaining the secondary protrusion is supplied, similarly to the lighting waveform shown in FIG. 6B, a lighting waveform has a waveform in which the boost current with the current value $I_b$ is superposed onto the regular (normal) lamp current, which consists of the rectangular wave pulse having the high frequency with the current value $I_n$, at a constant temporal incidence (interval).

On the other hand, as shown in FIG. 8B, in the low frequency part during which the low frequency alternating current SPML for maintaining the secondary protrusion is supplied, similarly to the lighting waveform shown in FIG. 7C, a lighting waveform includes the pseudo low frequency time periods CLT1 and CLT2. In this manner, the low frequency part does not necessarily have a rectangular wave pulse with a rigorous low frequency wave. Instead, the low frequency part may have a lighting waveform including the pseudo low frequency time period, which can substantially achieve the function of the low frequency wave.

Figure 9A:
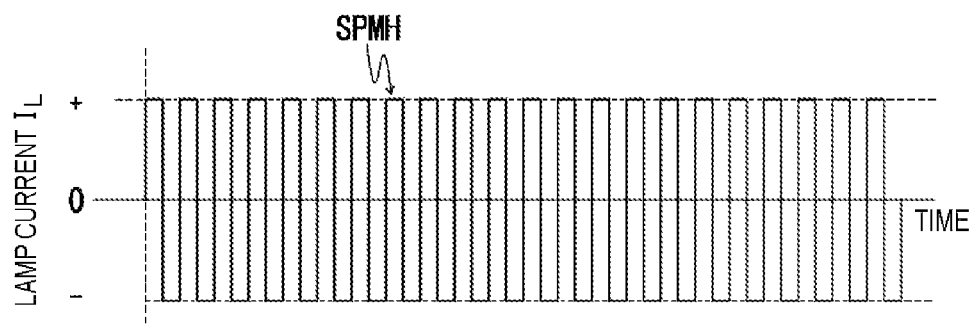
FIG. 9A is a view showing another application example of a lighting waveform of the high frequency part during the secondary protrusion maintaining process according to exemplary embodiments of the present invention.
Figure 9B:
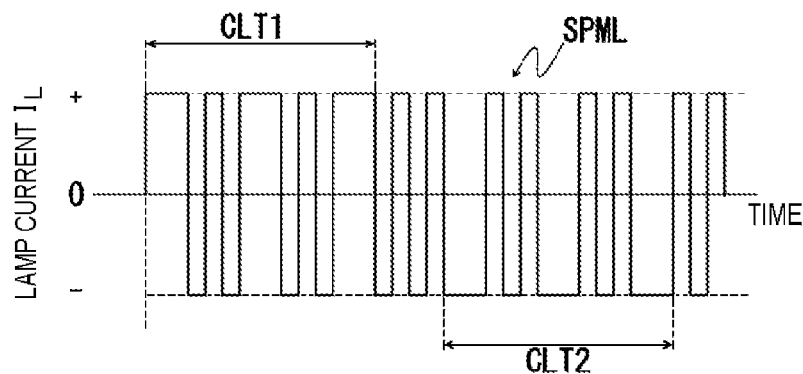
FIG. 9B is a view showing another application example of a lighting waveform of the low frequency part during the secondary protrusion maintaining process according to exemplary embodiments of the present invention.

FIGS. 9A and 9B show a yet further application example of a lighting waveform during the secondary protrusion maintaining process.

As shown in FIG. 9A, the high frequency part has, similarly to the lighting waveform shown in FIG. 4C, a lighting waveform with the secondary protrusion maintaining high frequency alternating current SPMH consisting of the rectangular wave pulse with the normal high frequency wave.

On the other hand, as shown in FIG. 9B, the low frequency part, during which the secondary protrusion maintaining low frequency alternating current SPML is supplied, has a lighting waveform including the pseudo low frequency time periods CLT1 and CLT2 in which the polarity is intermittently inverted (reversed) by partially polarity inverting a part of the rectangular wave pulse with the low frequency, which is supposed to be originally consecutive (continuous).

Possible advantage will be described here, although the unnecessarily detailed explanation will be omitted. That is, due to a configuration of a circuit and elements constituting the circuit, in some times it is not possible to maintain the lighting status with the low frequency at least for a certain time of period. In this case, by polarity inverting (reversing, performing the polarity inversion) in a breath taking manner, it makes it possible to charge and discharge by, for example, a prescribed capacitance to solve the above mentioned problem. In this case, it is possible to achieve a substantially similar effect to the case of the lighting status with an absolute low frequency, by providing the pseudo low frequency time periods CLT1 and CLT2, which is assumed to be a substantially lighting status with the low frequency, although technically speaking it is not the lighting status with the low frequency.

As described above, various lighting waveforms may be employed for the secondary protrusion forming or maintaining alternating current SPM. Yet furthermore, additionally or alternatively, those waveforms may be varied depending on, as described above, any of the lamp electric power, the lamp voltage, the lamp current, and combined parameter thereof.

Figure 10:
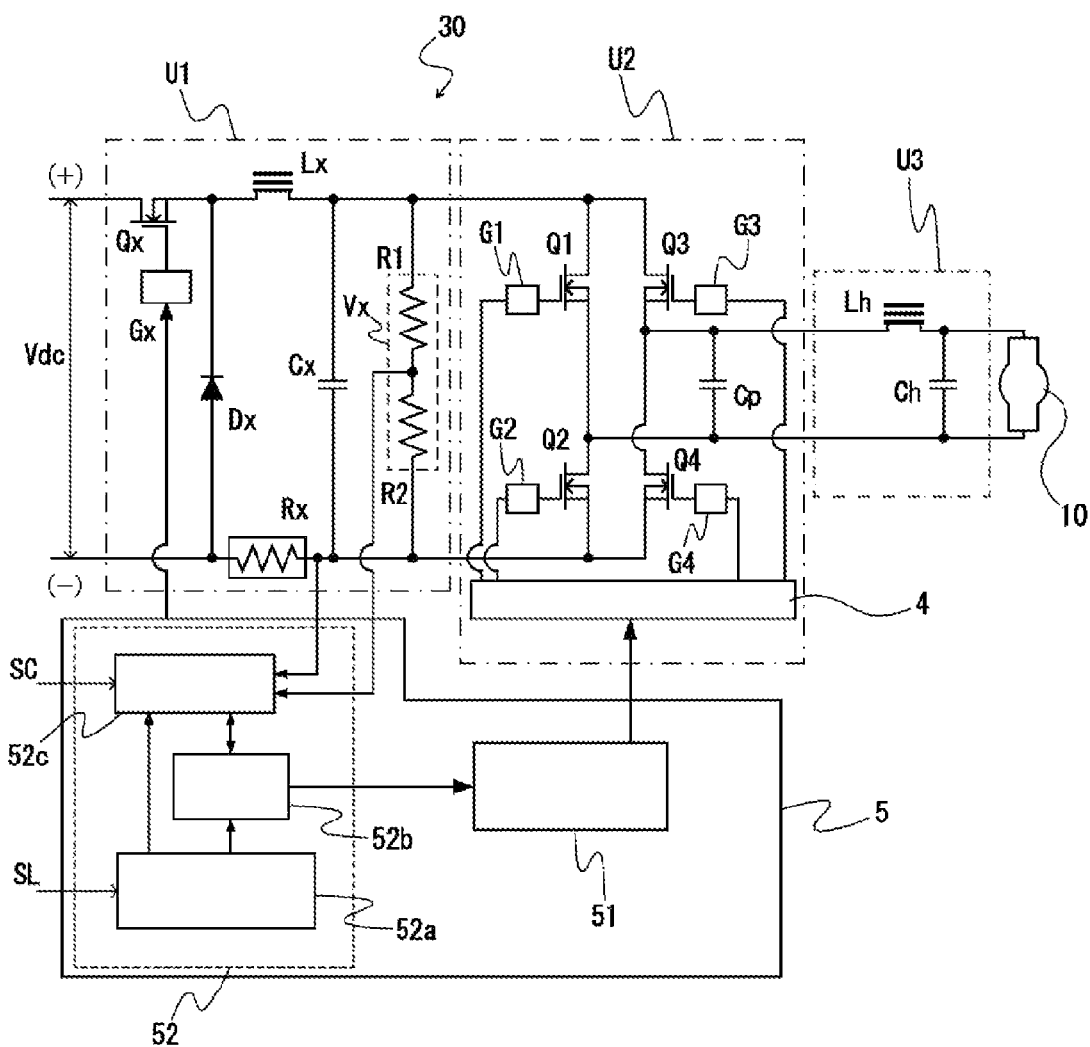
FIG. 10 is a view showing an exemplary configuration of a discharge lamp lighting apparatus according to exemplary embodiments of the present invention.

FIG. 10 is a view showing an exemplary configuration of the discharge lamp lighting apparatus according to exemplary embodiments of the present invention. The discharge lamp lighting apparatus comprises a discharge lamp 10 and a power supply device 30.

The power supply device 30 comprises a voltage lowering (dropping) chopper circuit U1 configured to supply a direct current voltage; a full bridge circuit U2 connected to an output side of the voltage lowering chopper circuit U1 and configured to transform the direct current voltage into an alternating current (AC) voltage and to supply the alternating current voltage to the discharge lamp 10; a starter circuit U3 connected to an output side of the full bridge circuit U2; and a controlling unit 5. The controlling unit 5 is capable of being configured with, for example, a processing unit such as a microprocessor or the like, and here the functional configuration is shown in a block diagram.

As shown in FIG. 10, the voltage lowering (dropping) circuit U1 comprises a switching element $Q_x$ and a reactor $L_x$ both connected to a "+" side power supply terminal to which the direct current voltage is supplied; a diode $D_x$ of which cathode side is connected between a connecting (interconnection) point of the switching element $Q_x$ and the reactor Lx and a "−" side power supply terminal; a smoothing capacitor $C_x$ connected to an output side of the reactor $L_x$; and a resistance $R_x$ for detecting the current connected between a "−" side terminal of the smoothing capacitor $C_x$ and an anode side of the diode $D_x$. The reference sign $G_x$ in FIG. 10 denotes a driving circuit for the switching element, which consists of, for example, a field effect transistor or the like, connected to the gate of the switching element $Q_x$.

By driving the above mentioned switching element $Q_x$ at a predetermined duty ratio, an input direct current voltage $V_{dc}$ is lowered down to a voltage corresponding to the duty. At an output side of the voltage lowering chopper circuit U1, a voltage detecting circuit $V_x$ is provided, which consists of a series circuit of resistances R1 and R2.

The full bridge circuit U2 comprises switching elements Q1 to Q4 connect to one another in a bridged shape; a switching element driving circuits G1 to G4 corresponding to the switching elements Q1 to Q4, respectively; and a driver 4 to allow the switching element driving circuits G1 to G4 to operate. The full bridge circuit U2 performs the polarity inverting (reversing) operation in response to a driving signal output from the driver 4.

In particular, the full bridge circuit U4 alternately performs a first switching operation and a second switching operation. The first switching operation turns on the switching element Q1 and the switching element Q4 together, and the second switching operation turns on the switching element Q2 and the switching element Q3 together. Thus, the full bridge circuit U4 generates an alternating current voltage with a rectangular wave shape between a connecting point of the switching elements Q1 and Q2 and another connecting point of the switching elements Q3 and Q4. When the switching elements Q1 and Q4 are both turned on, then the switching elements Q2 and Q3 are both turned off. Likewise, when the switching elements Q2 and Q3 are both turned on, then the switching elements Q1 and Q4 are both turned off.

The starter circuit U3 comprises a coil $L_h$ and a capacitor $C_h$ both connected in series to the discharge lamp 10, respectively. Then, a capacitor $C_p$ is connected between an input side of the coil $L_h$ and a cathode (negative) side terminal of the capacitor $C_h$. When the discharge lamp 10 is to be started, an alternating current voltage with a high switching frequency, which is in the neighborhood of a resonant frequency of a LC series circuit consisting of the coil $L_h$ and the capacitor $C_h$, is applied from the bridge circuit U2. Accordingly, a sufficiently high voltage required for starting the discharge lamp 10 is generated at an output side of the starter circuit U3 and supplied to the discharge lamp 10. It should be noted that, after the discharge lamp 10 is lit, then a regular (normal) lighting operation is performed with the basic frequency (i.e., 60 Hz to 1,000 Hz) of the regular lighting mode, for example, the rated lighting mode.

In the above mentioned power supply device 30, it can be achieved to control an output electric power to the discharge lamp 10 and to regulate the above mentioned boost ratio, by regulating an operational duty of the switching element $Q_x$ of the voltage lowering chopper circuit U1.

The switching element $Q_x$ of the voltage lowering chopper circuit U1 is turned on/off in response to the duty of a gate signal $G_x$ so that the electric power supplied to the discharge lamp 10 varies. In other words, for increasing the electric power, the duty of the switching element $Q_x$ is to be increased. Likewise, for decreasing the electric power, the duty of the switching element $Q_x$ is to be decreased. In this manner, the gate signal $G_x$ is controlled such that the lamp electric power values is to coincide with a regulating instruction signal SC, which is input, for regulating the lighting electric power. Also, when boosting, the duty of the switching element $Q_x$ is to be increased and the boost current is superposed onto the regular (normal) lamp current.

It can be achieved to regulate the frequency of the alternating current supplied to the discharge lamp 10 by regulating a switching cycle length of the switching elements Q1 to Q4 of the full bridge circuit U2.

The controlling unit 5 comprises a driving signal generating unit 51 and a controller 52.

The driving signal generating unit 51 is configured with, for example, a processor or the like.

The controller 52 comprises a lighting operation controlling unit 52a configured to control the lighting operation of the discharge lamp 10; a driving signal selecting unit 52b configured to control an output from the driving signal generating unit 51; and an electric power controlling unit 52c configured to drive the switching element $Q_x$ of the voltage lowering chopper circuit U1 with the preset duty in response to the regulating instruction signal SC for regulating the lighting electric power from outside, so as to control the lamp electric power.

The electric power controlling unit 52c calculates the lamp electric power by obtaining the lamp current $I_L$ and the lamp voltage $V_L$ from voltages between both ends of the resistance $R_x$ for detecting the current and a voltage detected by the resistances R1 and R2 for detecting the voltage. The electric power controlling unit 52c then controls the duty of the switching element $Q_x$ of the voltage lowering chopper circuit U1 such that the calculated lamp electric power is to coincides with a magnitude in response to the regulating instruction signal SC for regulating the lighting electric power. Furthermore, the electric power controlling unit 52c determines whether the regulating instruction signal SC for regulating the lighting electric power corresponds to the lamp electric power value of the regular lighting mode, or it corresponds to the lamp electric power value of the low electric power lighting mode, and then transmits the determination result to the driving signal selecting unit 52b. For example, when the regulating instruction signal SC for regulating the lighting electric power is switched from a signal corresponding to the regular lighting mode to a signal corresponding to the low electric power lighting mode, the electric power controlling unit 52c then sends a lighting mode determination signal corresponding to the low electric power lighting mode to the driving signal selecting unit 52b.

The driving signal selecting unit 52b sends a driving signal selecting signal corresponding to the lighting mode determination signal to the driving signal generating unit 51. On the other hand, the driving signal selecting unit 52b sends, when boosting, a driving signal selecting signal corresponding to a boost signal from the lighting operation controlling unit 52a to the driving signal generating unit 51.

The driving signal generating unit 51 generates, in response to the driving signal selecting signal, the switching element driving signal and sends the generated switching element driving signal to the driver 4. For example, when the lamp is being lit in the regular lighting mode or otherwise the low electric power lighting mode, the driving signal generating unit 51 outputs the switching element driving signal corresponding to the lighting mode of the discharge lamp 10. On the other hand, when boosting, the driving signal generating unit 51 outputs the switching element driving signal corresponding to the boost signal from the lighting operation controlling unit 52a.

Hereinafter, an operation of the lighting apparatus according to exemplary embodiments of the present invention will be described below.

When the lighting instruction signal SL is given, then the power supply to the discharge lamp 10 is started. Concurrently, the lighting operation controlling unit 52a of the controller 52 generates a starter circuit driving signal and allows the starter circuit U3 to light the discharge lamp 10.

When the discharge lamp 10 is lit, then the electric power controlling unit 52c calculates the lamp electric power from the lamp voltage $V_L$, which is detected by the resistances R1 and R2 for detecting the voltage, and the lamp current $I_L$, which is detected by the resistance $R_x$. Then, the electric power controlling unit 52c of the controller 52 controls, based on the regulating instruction signal SC for regulating the lighting electric power and the above calculated lamp electric power value, the switching element $Q_x$ of the voltage lowering chopper circuit U1 so as to control the lamp electric power.

In other words, the switching element $Q_x$ of the voltage lowering chopper circuit U1 changes depending on the duty of the gate signal $G_x$. More particularly, when the regulating instruction signal SC for regulating the lighting electric power is input from the outside, for increasing the electric power, the duty of the switching element $Q_x$ is increased, on the other hand, for decreasing the electric power, the duty of the switching element $Q_x$ is then decreased. In this manner, the gate signal $G_x$ is controlled such that the lamp electric power values is to coincide with the input regulating instruction signal SC for regulating the lighting electric power.

When the lamp is being lit during the regular lighting mode, in which the regulating instruction signal SC for regulating the lighting electric power has a large lamp electric power value, in other words, the lamp electric power value is greater than 80% of the rated power consumption, then the driving signal selecting unit 52b of the controller 52 allows the driving signal generating unit 51 to output the switching element driving signal that is predetermined corresponding to the regular lighting mode so as to drive the driver 4. Moreover, the electric power controlling unit 52c, in response to the driving signal selecting signal corresponding to the regular lighting mode from the driving signal selecting unit 52b, sets an output electric power to the discharge lamp 10 to the lamp electric power corresponding to the regular lighting mode.

With the above components being operated, the full bridge circuit U2 performs a polarity inversion (reversal) operation corresponding to the driving signal from the driver 4, and the discharge lamp 10 is being lit with the lighting waveform corresponding to the regular lighting mode. At this moment, the discharge lamp 10 is driven with the lighting waveform in which the low frequency part with the frequency of 5 to 200 Hz is inserted (superposed) onto the high frequency part with the basic frequency of 60 Hz to 1,000 Hz.

When the discharge lamp is being lit in the low electric power lighting mode, in which the regulating instruction signal SC for regulating the lighting electric power has a small lamp electric power value, in other words, the lamp electric power value is equal to or less than 80% of the rated power consumption (for a practical purpose, 25 to 80%), then the driving signal selecting unit 52b of the controller 52 allows the driving signal generating unit 51 to output the switching element driving signal that is predetermined corresponding to the low electric power lighting mode so as to drive the driver 4. Moreover, the electric power controlling unit 52c, in response to the driving signal selecting signal corresponding to the low electric power lighting mode from the driving signal selecting unit 52b, sets an output electric power to the discharge lamp 10 to the lamp electric power corresponding to the low electric power lighting mode.

With the above components being operated, the full bridge circuit U2 performs a polarity inversion (reversal) operation corresponding to the driving signal from the driver 4, and the discharge lamp 10 is being lit with the lighting waveform corresponding to the low electric power lighting mode as shown in, for example, FIGS. 4B and 4D.

Hereinafter, an operation of the lighting apparatus according to exemplary embodiments of the present invention when boosting will be also described below.

When the discharge lamp is being lit in the low electric power lighting mode, the lighting operation controlling unit 52a outputs a boost signal at a predetermined cycle length. The driving signal selecting unit 52b outputs a driving signal selecting signal corresponding to the boost signal. The driving signal generating unit 51 outputs a switching element driving signal corresponding to the boost signal.

On the other hand, the above mentioned boost signal is also output to the electric power controlling unit 52c. The electric power controlling unit 52c increases, in response to the boost signal, the duty of the switching element $Q_x$ of the voltage lowering chopper circuit U1.

With the above components being operated, the electric power controlling unit 52c boosts the output electric power to the discharge lamp 10 during the boost signal is being output. The discharge lamp 10 is supplied with, every time the boost signal is output, the lamp current $I_L$ in which the current value $I_b$ of the boost current is superposed onto the current value $I_n$ of the normal lamp current.

Examples

Hereinafter, experimental results in which the effect of the present embodiments has been verified will be describe below, as a non-limiting exemplary examples.

Figure 11A:
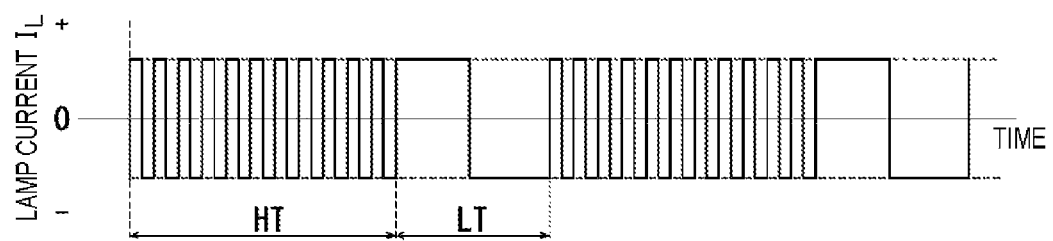
FIG. 11A is a view showing an exemplary lighting waveform when a lamp is being lit in a rated lighting mode of a conventional discharge lamp lighting apparatus.
Figure 11B:
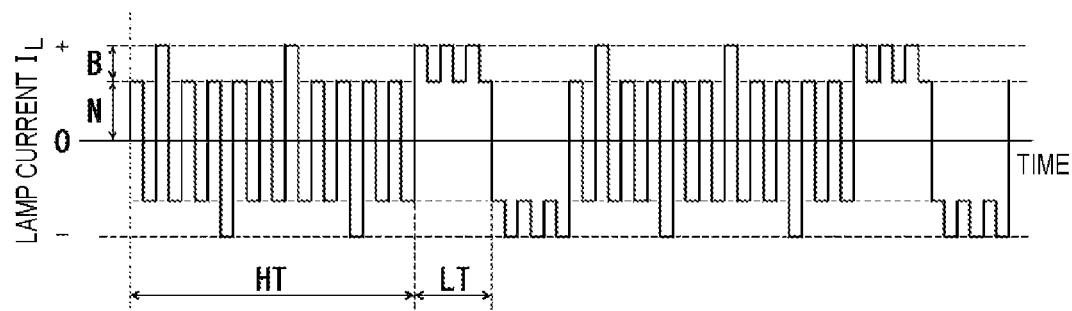
FIG. 11B is a view showing an exemplary lighting waveform when the lamp is being lit in a low electric power lighting mode of the conventional discharge lamp lighting apparatus.

The effect of the present embodiments has been verified on forming and maintaining the secondary protrusions, by switching between the lighting modes shown in FIG. 3 and evaluating the status in which the flickering occurs. According to the concrete examples of the present invention, the discharge lamp has been lit with the lighting waveform shown in FIG. 4A in the regular lighting mode. Likewise, the discharge lamp has been lit with the lighting waveform shown in FIG. 4B in the low electric power lighting mode. As comparative examples, the discharge lamp has been lit with the lighting waveform shown in FIG. 11A in the regular lighting mode, and the discharge lamp has been lit with the lighting waveform shown in FIG. 11B in the low electric power lighting mode.

According to the concrete examples of the present embodiments, as shown in Table 1 below, the frequency of the secondary protrusion forming alternating current (SPF) during the secondary protrusion forming process in the low electric power lighting mode was 1,000 Hz. Likewise, the frequency of the secondary protrusion maintaining high frequency current (SPMH) during the secondary protrusion maintaining process was 720 Hz, and the frequency of the secondary protrusion maintaining low frequency current (SPML) was 120 Hz.

On the other hand, according to the comparative examples, as shown in Table 2 below, the discharge lamp has been lit with the waveform that constantly consists of the high frequency time period (HT), which has the rectangular wave pulse with the high frequency current of 740 Hz, and the low frequency time period (LT), which had the rectangular pulse with the low frequency current of 92.5 Hz, without dividing the low electric power lighting mode into two processes.

TABLE 1

|  | Regular Lighting Mode | | Low Electric Power Lighting Mode | | |
|---|---|---|---|---|---|
|  | | | Secondary Protrusion Forming Process | Secondary Protrusion Maintaining Process | |
|  | High | Low | High | High | Low |
|  | High Frequency Current | Low Frequency Current | Frequency Current (SPF) | Frequency Current (SPMH) | Frequency Current (SPML) |
| Examples | 370 Hz | 30 Hz | 1,000 Hz | 720 Hz | 120 Hz |

TABLE 2

|  | Regular Lighting Mode | | Low Electric Power Lighting Mode | |
|---|---|---|---|---|
|  | High Frequency Current | Low Frequency Current | High Frequency Current | Low Frequency Current |
| Comparative Examples | 370 Hz | 30 Hz | 740 Hz | 92.5 Hz |

Commonly among the concrete examples of the present embodiments and the comparative examples, the rated power consumption (consumption power) of the discharge lamp subject to the above evaluation was 270 W, and the lamp electric power in the low electric power lighting mode was 63% with respect to the rated power consumption, that was, 170 W.

The occurrence of the flickering was determined by an illuminance intensity variation (degree of variation) on a projection plane. More particularly, the illuminance has been measured using an illuminance mater at an interval of 100 ms. The case in which the degree of variation of illuminance intensity, which was indicated by the maximum variation thereof, was less than 2.0% was evaluated as a circle (i.e., excellent), the case in which the degree of variation of illuminance intensity was less than 3.0% was evaluated as a triangle (i.e., good), and the case in which the degree of variation of illuminance intensity was equal to or greater than 3.0% was evaluated as an ex (i.e., target unattained). This is because the flickering becomes visible with human eyes when the degree of variation of illuminance intensity is equal to or greater than 3.0%. The result is shown in Table 3 below.

According to the comparative examples, which were conducted as the comparative experiments, even under the target low electric power (dimming ratio of 63%), the discharge lamp has been lit with a constant waveform without dividing the processes. As a result, as shown in Table 3 above, it required 3 minutes until the secondary protrusion was formed and the flickering status became the triangle (good), which might be assumed that it took time for forming the secondary protrusion. After then, the lighting continued for 1 hour as the experiment for forming the secondary protrusion, and it was confirmed that the flickering status became the circle (excellent) and stable.

Subsequently, the lighting experiment further continued without intervention, and the discharge lamp continued to be lit with the same waveform. Yet subsequently, when 50 hours elapsed after the lighting being started, the degree of variance of the illuminance suddenly increased and the flickering status were lowered to the triangle (good). Yet subsequently, when 100 hours elapsed, the degree of variance of the illuminance exceeded 3% and the flickering status were further lowered to the ex (target unattained).

According to the above observed results, in the comparative examples, the secondary protrusion can be formed provided that it can take a sufficiently lot of time. Nevertheless, after then, it is turned out that, if the discharge lamp is consecutively being lit, the once generated secondary protrusion disperses and the low electric power lighting for a long time period is adversely affected.

In contrast, according to the examples of the present embodiments, as shown in Table 3 above, the lighting operation was carried out with the waveform of the secondary protrusion forming process for 1 hour after the lighting mode was switched to the low electric power lighting mode, in order to carry out the experiment of secondary protrusion forming. Subsequently, after 1 hour elapsed, the lighting operation was carried out with the waveform of the secondary protrusion maintaining process in order to carry out the experiment of the secondary protrusion maintaining.

According to the above observed result, in the present embodiments, it was confirmed that the flickering status became the circle (excellent) and the secondary protrusion was quickly formed. Furthermore, since then, even the lighting operation was being continued, the flickering status was not observed to be deteriorated.

Even after the process transitions to the secondary protrusion maintaining process after 1 hour elapsed, the flickering status was still observed to be stable. Yet subsequently,

TABLE 3

|  |  | Lighting Time | | | | | | | | |
|---|---|---|---|---|---|---|---|---|---|---|
|  |  | Secondary Protrusion Forming Experiment | | | | | | Secondary Protrusion Maintaining Experiment | | |
|  |  | 1 Min | 3 Min | 5 Min | 10 Min | 30 Min | 1 Hr | 10 Hrs | 50 Hrs | 100 Hrs |
| Comparative Examples | Evaluation Result | X | Δ | ○ | ○ | ○ | ○ | ○ | Δ | X |
|  | Variance in Illuminance | 5.70% | 2.70% | 1.20% | 1.40% | 0.70% | 1.20% | 1.10% | 2.10% | 4.50% |
| Examples | Evaluation Result | ○ | ○ | ○ | ○ | ○ | ○ | ○ | ○ | ○ |
|  | Variance in Illuminance | 0.90% | 1.30% | 1.10% | 0.70% | 1.00% | 1.30% | 0.70% | 0.70% | 1.20% | the flickering status was sufficiently stable even after 100 hours elapsed so that the experiments was terminated at this point.

As described above, unlike the conventional lighting apparatus, the present embodiments employs the lighting apparatus in which, in the low electric power lighting mode, the low electric power lighting mode is divided into two processes, that is, the secondary protrusion forming and the secondary protrusion maintaining, and two processes has optimized waveform, respectively. As a result, it is capable of solving the problem of the flickering that is likely to occur when the discharge lamp is being lit in the low electric power lighting mode.

REFERENCE SIGNS LIST

U1 Voltage Lowering Chopper Circuit
U2 Full Bridge Circuit
U3 Starter Circuit
4 Driver
5 Controlling Unit
10 Discharge Lamp
11 Light Emitting Portion
12 Tube Sealing Portion
20a, 20b Electrodes
21a, 21b Primary Protrusions
22a, 22b Secondary Protrusions
13 Metal Foil
14 Outer Lead Rod
51 Driving Signal Generating Unit
52 Controller
52a Lighting Operation Controlling Unit
52b Driving Signal Selecting Unit
52c Electric Power Controlling Unit
Qx Switching Element
Lh, Lx Coils
Cx, Ch, Cp Capacitances
Q1, Q2, Q3, Q4, Qx Switching Elements
Dx Diode
R1, R2, Rx Resistances
Vx Voltage Detection Circuit
G1, G2, G3, G4, Gx Switching Element Driving Circuit

What is claimed is:

1. A discharge lamp lighting apparatus, comprising:
a discharge lamp in which a pair of electrodes each having a protrusion at a tip end thereof are arranged to face each other at an interval equal to or less than 2.0 mm in an arc tube, the arc tube enclosing mercury and halogen of 0.20 mg/mm$^3$ or more; and
a power supply device configured to supply an alternating current to the discharge lamp,
the power supply device being configured to drive in a switchable manner between a regular lighting mode, in which the discharge lamp is being lit with a basic frequency selected within a range of 60 Hz to 1,000 Hz, and a low electric power lighting mode, in which the discharge lamp is being lit with an electric power value within a range of 25 to 80% with respect to a rated power consumption of the discharge lamp, and
the power supply device being configured to control a power supply to the discharge lamp such that, in the low electric power lighting mode, after a secondary protrusion forming process in which a secondary protrusion forming alternating current having a frequency equal to or greater than the basic frequency in the regular lighting mode is supplied while lowering an electric power of the lamp, the frequency being selected within a range of 200 to 2,000 Hz,
the low electric power lighting mode transitioning to a secondary protrusion maintaining process in which a secondary protrusion maintaining high frequency current having a frequency higher than the basic frequency in the regular lighting mode, the frequency being selected within a range of 100 Hz to 1,500 Hz, and a secondary protrusion maintaining low frequency current having a frequency lower than the frequency of the secondary protrusion maintaining high frequency current is alternately supplied as a secondary protrusion maintaining alternating current, wherein,
during the secondary protrusion forming process, a secondary protrusion forming alternating current is supplied in which a boost current is superposed onto a regular lamp current with the selected frequency at a predetermined temporal interval, wherein
a superposing ratio or a temporal interval of the boost current varies depending on any of a lamp electric power, a lamp voltage, a lamp current, and combined parameter thereof, wherein,
when the superposing ratio of the boost current is varied, the superposing ratio is varied towards a target superposing ratio in a stepwise manner.

2. A discharge lamp lighting apparatus, comprising:
a discharge lamp in which a pair of electrodes each having a protrusion at a tip end thereof are arranged to face each other at an interval equal to or less than 2.0 mm in an arc tube, the arc tube enclosing mercury and halogen of 0.20 mg/mm$^3$ or more; and
a power supply device configured to supply an alternating current to the discharge lamp,
the power supply device being configured to drive in a switchable manner between a regular lighting mode, in which the discharge lamp is being lit with a basic frequency selected within a range of 60 Hz to 1,000 Hz, and a low electric power lighting mode, in which the discharge lamp is being lit with an electric power value within a range of 25 to 80% with respect to a rated power consumption of the discharge lamp, and
the power supply device being configured to control a power supply to the discharge lamp such that, in the low electric power lighting mode, after a secondary protrusion forming process in which a secondary protrusion forming alternating current having a frequency equal to or greater than the basic frequency in the regular lighting mode is supplied while lowering an electric power of the lamp, the frequency being selected within a range of 200 to 2,000 Hz,
the low electric power lighting mode transitioning to a secondary protrusion maintaining process in which a secondary protrusion maintaining high frequency current having a frequency higher than the basic frequency in the regular lighting mode, the frequency being selected within a range of 100 Hz to 1,500 Hz, and a secondary protrusion maintaining low frequency current having a frequency lower than the frequency of the secondary protrusion maintaining high frequency current is alternately supplied as a secondary protrusion maintaining alternating current, wherein,
during the secondary protrusion maintaining process, a secondary protrusion maintaining alternating current is supplied in which a boost current is superposed onto a regular lamp current with the selected frequency at a predetermined temporal interval, wherein a superposing ratio or a temporal interval of the boost current varies depending on any of a lamp electric power, a lamp voltage, a lamp current, and combined parameter thereof, wherein, when the superposing ratio of the boost current is varied, the superposing ratio is varied towards a target superposing ratio in a stepwise manner.

\* \* \* \* \*